R. J. McNITT.
METHOD OF PRODUCING CHLORIDS OF TIN.
APPLICATION FILED APR. 28, 1908.
1,030,110. Patented June 18, 1912.
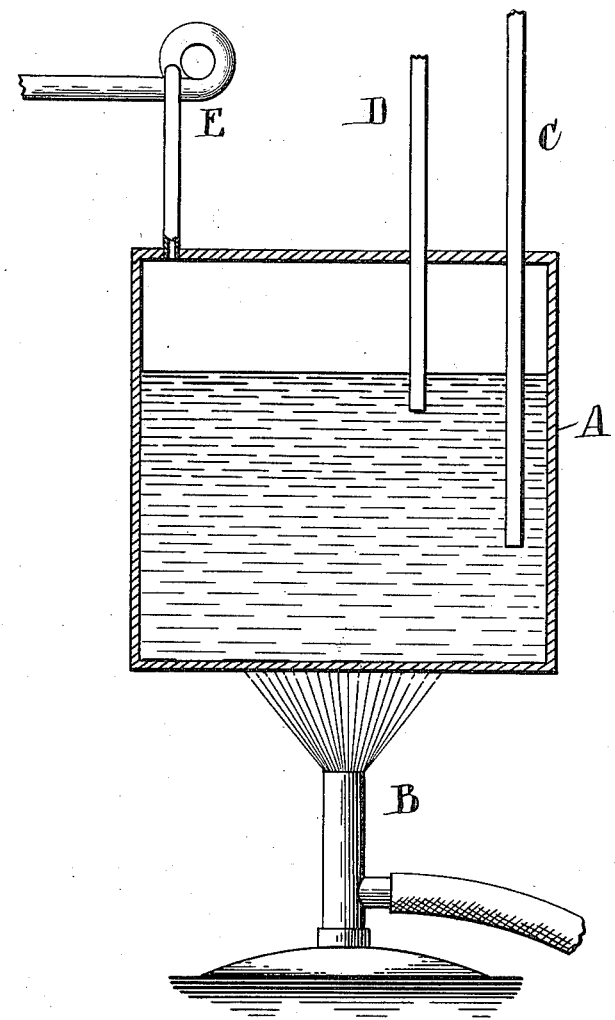
Attest:
Inventor:

UNITED STATES PATENT OFFICE.

ROBERT J. McNITT, OF NIAGARA FALLS, NEW YORK, ASSIGNOR TO THE CHLORINE PRODUCTS COMPANY, OF NEW YORK, N. Y., A CORPORATION OF NEW YORK.

METHOD OF PRODUCING CHLORIDS OF TIN.

1,030,110.

Specification of Letters Patent. Patented June 18, 1912.

Application filed April 28, 1908. Serial No. 429,611.

*To all whom it may concern:*

Be it known that I, ROBERT J. McNITT, a citizen of the United States, residing at Niagara Falls, in the county of Niagara and State of New York, have invented a certain new and useful Method of Producing Chlorids of Tin, of which the following is a specification.

This invention relates to a method of producing chlorids of tin, based on the facility with which chlorin gas is absorbed by a hot concentrated solution of chlorids of tin, and also on the violent solution of metallic tin which occurs in the hot concentrated solutions of chlorids of tin.

This invention rests on the discovery that the temperature of certain concentrated solutions of chlorids of tin may be raised to the boiling point and held there for an indefinite period without the formation therein of undesirable substances, as for example, meta-stannic acid. By taking advantage of this discovery it is possible to produce chlorids of tin more simply and cheaply than has hitherto been done by working with diluted solutions and at low temperatures. Aside from simplifying the method of making chlorids of tin, through increasing the rate at which tin and chlorin can be taken into solution, another important advantage arising from this discovery is that products of maximum concentration and purity may be readily obtained owing to the high temperatures and concentration at which they may be produced.

I am aware of the processes disclosed in United States Patents Numbers 810,454; 810,455; and 810,456, to Acker and distinguish my invention from theirs by the fact that I have succeeded in operating at much higher temperatures, thus simplifying the apparatus required and the method of procedure as well as in producing a more concentrated product. A further improvement of my invention is represented by the fact that I am able to finish the product stannic chlorid without the use of some oxidizing agent such as sodium or potassium chlorate, as by my process chlorin tin and water alone are necessary, thus saving the cost of the chlorate and at the same time yielding a purer product.

I am also aware of certain processes in which chlorids of tin are produced at high temperature and concentration, through the agency of anhydrous stannic chlorid as described by Lorenz (see Dammer "*Handbuch der Anorganischen Chemie*" IV, 1892–1902, page 395); by United States Patent No. 877,261 to Townsend, and by a series of United States patents to Sperry. My invention is quite distinct from these as I work with aqueous solutions only, and, owing to the fact that crystalline salts appear even at higher temperatures (150° C. for example), if the solution becomes too concentrated I add sufficient water to the solution to prevent the possibility of the formation of anhydrous stannic chlorid.

The method of producing chlorids of tin which I have described may vary through a wide range, but, by way of illustration, I shall describe in connection with the accompanying drawing one way of producing stannic chlorid, although my invention is not limited to the operations stated or to making stannic chlorid only or to this specific apparatus shown.

Referring to the accompanying drawing, which is a diagrammatic view of apparatus adapted for carrying out my process, A represents a vessel preferably of earthenware adapted to contain a concentrated solution of chlorid of tin and be kept at a temperature of approximately 130° C. by any convenient means such as a suitable burner B if such external heat be necessary. Metallic tin is charged into the vessel A and into the solution of chlorids of tin. Chlorin gas is admitted into the solution through pipe C extending below the surface of the liquor and water is admitted as required through pipe D, which pipe may extend below the surface of the liquor or not, until the solution reaches the desired degree of purity and concentration, which characteristics can be readily ascertained by any convenient test, such as removing and testing a sample in the well known way, to determine the proportion of tin present and the absence of stannous chlorid. More or less chlorin gas may be admitted through pipe C according to the product desired, for example, whether stannic or stannous chlorid.

E represents an exhaust fan for drawing the chlorin gas through the solution.

I have found that the process does not work satisfactorily at a temperature approximately less than 80° C., although I prefer to work at a higher temperature than this or in the neighborhood of 130° C. I have also found the best results to be when the solution is maintained at such a concentration that the stannous chlorid present therein, is near the point of precipitation, as may be readily determined by drawing a sample from the solution and allowing the same to stand until its temperature drops a few degrees and precipitation of the stannous chlorid follows. In heating the solution to the desired temperature a certain portion will, of course, distil over and may be condensed, the distillate consisting of a solution of tin salts in water.

By chlorin gas I mean to include not merely chemically pure chlorin gas but any mixture of gases containing chlorin, as for example, gaseous products obtained from various processes for electrolyzing chlorids. By water I mean to include water in any form whether liquid, vapor or solid.

What I claim and desire to secure by Letters Patent is:—

1. The method of making chlorids of tin consisting in passing chlorin gas directly into a concentrated solution of chlorids of tin in the presence of metallic tin at a temperature above approximately 80° C., and admitting water in such proportion as to produce the desired product and to prevent the presence of anhydrous stannic chlorid.

2. The method of making stannic chlorid consisting in passing chlorin gas directly into a concentrated solution of chlorids of tin in the presence of metallic tin at a temperature above approximately 80° C., and admitting water in such proportion as to produce the desired product and to prevent the presence of anhydrous stannic chlorid, and continuing the passing of chlorin gas until the tin is all converted into tin chlorid.

3. The method of making chlorids of tin consisting in passing chlorin gas directly into a solution of chlorids of tin in the presence of metallic tin at a temperature above approximately 80° C., and admitting water in such proportion as to produce the desired product and to prevent the presence of anhydrous stannic chlorid, so that when the metallic tin has been dissolved and not replenished there shall remain a solution of stannic chlorid of the desired strength.

In testimony whereof I have hereunto signed my name in the presence of two subscribing witnesses.

ROBERT J. McNITT.

Witnesses:
H. R. CARVETH,
JESSIE B. McVEAN.

---

Copies of this patent may be obtained for five cents each, by addressing the "Commissioner of Patents, Washington, D. C."